Sept. 18, 1945.  B. WELTE  2,385,119
BROACHING MACHINE
Filed June 21, 1943  5 Sheets-Sheet 3

INVENTOR.
Benedict Welte.
BY
Barness, Dickey & Pierce.
ATTORNEYS

Sept. 18, 1945.                B. WELTE                    2,385,119
                           BROACHING MACHINE
                         Filed June 21, 1943            5 Sheets-Sheet 4

INVENTOR.
Benedict Welte.
BY
Harness Dickey & Pierce.
ATTORNEYS

Patented Sept. 18, 1945

2,385,119

UNITED STATES PATENT OFFICE 2,385,119

BROACHING MACHINE

Benedict Welte, Lake Orion Township, Oakland County, Mich., assignor to Colonial Broach Company, Detroit, Mich., a corporation of Delaware Application June 21, 1943, Serial No. 491,573

14 Claims. (Cl. 90—33)

The present invention relates to a surface broaching machine of the type adapted to make a plurality of successive cuts on a single workpiece with the same broaching tool, and is a continuation-in-part of applicant's copending application, Serial No. 478,508, filed March 9, 1943.

It is the general object of the present invention to provide an improved hydraulic circuit for operating and controlling the movements of the broach and the work holding fixture, or table, during the successive broaching operations. More specifically, it is an object of the present invention to provide automatically operable hydraulic means to reciprocate the broach through a predetermined number of broaching and broach return strokes and at the same time advance the work table to broaching position at the end of each broach return stroke and retract the table at the end of each broaching stroke.

Another object of the invention is to provide an improved hydraulic and mechanical indexing mechanism for controlling the operation of the machine through a predetermined number of cycles and then bringing the machine to a stop.

Another object of the invention is to provide improved and simplified means in an automatic multiple stroke broaching machine for controlling the operation of the machine in such a manner that the broaching ram takes a plurality of roughing strokes followed by a single finishing stroke of greater length than the roughing strokes in order that the finishing teeth of the broach will not contact the work except upon the finishing operation.

Other objects and advantages of the invention will become apparent from the following specification, the drawings relating thereto, and from the claims hereinafter set forth.

In the drawings, in which like numerals are used to designate like parts in the several views throughout.

Referring to the drawings, the invention is shown applied to a vertical broaching machine having a main frame 10 and a vertically movable broaching slide 11, which is formed integrally with a hydraulic cylinder 12 which is reciprocated with reference to a stationary piston under the control of the hydraulic circuit hereinafter described. Mounted on the slide 11 is a face plate 12' carrying a pair of tool holding channel-shaped members 13. In the present instance, the machine is designed for operating upon two workpieces simultaneously and for simultaneously cutting two relatively deep notches in each of the workpieces. Consequently, the tool holding channels support four broaching tools 14.

The frame of the machine includes a forwardly projecting portion having a top surface 15 defining a horizontal slide on which is mounted the work moving and supporting table 16. A pair of retaining plates 17 located at opposite sides of the work table are fixed to the top surface 15 of the frame and overlie the edges of the work table 16 to retain the table in position while permitting it to reciprocate toward and from the broach.

The top frame member 15 contains a longitudinally extending slot 18 at its center, into which projects a downwardly extending rib 19 on the table 16. Journaled in a sleeve 20 on the table is a centrally located vertical pin 21, the lower end of which is formed into a rectangular shoe 22 which lies below the bottom surface of the rib 19 and also below the bottom surface of the member 15 of the frame. The shoe 22, which is of hardened steel, fits in a hardened steel cam groove 23 formed in a transverse slide 24, which is mounted in suitable ways 25 on the underside of the frame member 15 for movement transverse to the movement of the table 16. The slot 23 is diagonal, as best shown by dotted lines in Figure 3, in consequence of which transverse reciprocation of the slide 24 effects longitudinal reciprocation of the table 16. Such transverse reciprocation of the slide 24 is effected by a movable key cylinder 26, which is keyed to the slide 24 by key 27 and which slides upon a pair of aligned stationary piston rods 28 and 29 fixed to the frame of the machine.

The arrangement of the means for reciprocating the table so far described is substantially like that disclosed in applicant's Patent No. 2,225,191 except that the cam groove in the present instance is straight, rather than arcuate, and the angle of the cam groove 23 in the present construction is such an angle that the force exerted on the table by the broach will not be effective to cause movement of the slide 24 against the minimum pressure exerted by the table moving piston and cylinder regardless of the position of the shoe 22 in the groove 23.

Figures 1, 2, 3:
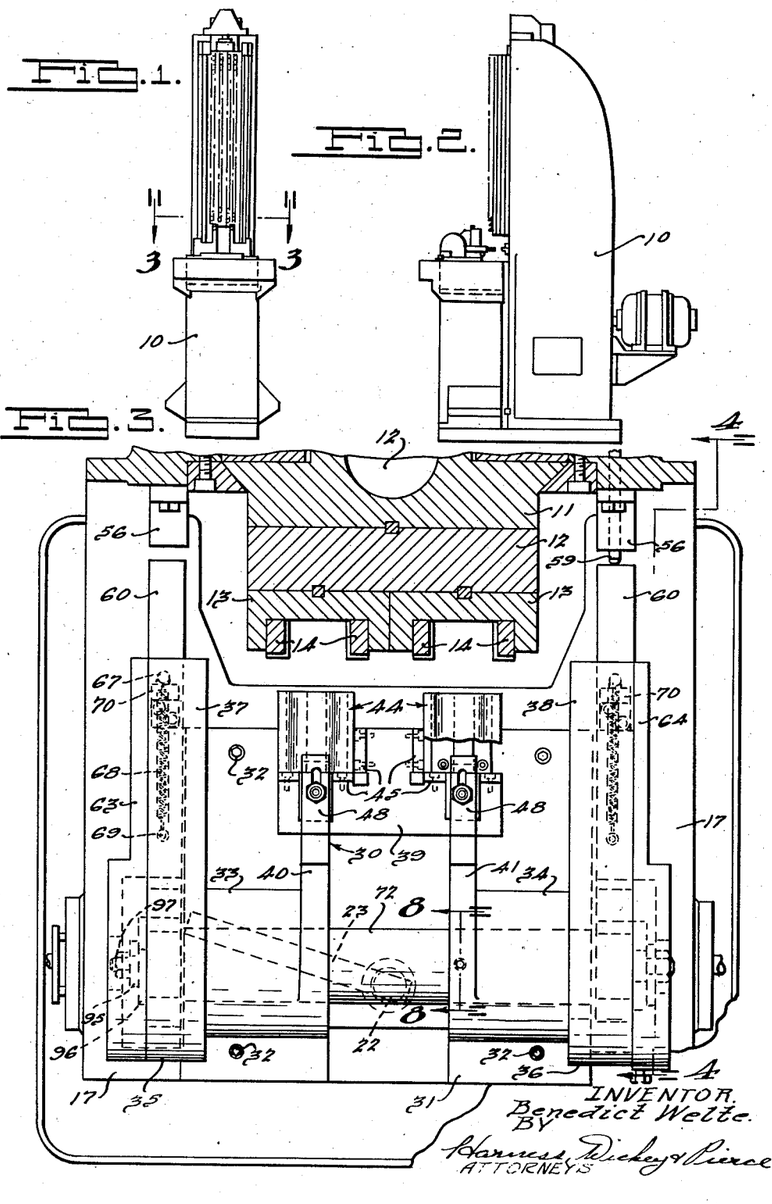
Figure 1 is a front elevation of a vertical broaching machine to which the invention may be applied.
Figure 2 is a side view of the broaching machine shown in Figure 1.
Figure 3 is a fragmentary sectional view taken on the line 3—3 of Figure 1, showing a plan view of the work moving fixture.

A work holding fixture is mounted upon the table 16 and includes means for locating the position of the table during the broaching operations. This fixture comprises a main casting, indicated generally at 30. The casting 30 includes a flat base portion 31 secured to the table 16 in any suitable manner, as by bolts 32, and a pair of transversely aligned bosses 33 and 34, the outer ends of which are enlarged to form housings 35 and 36, respectively. The casting 30 also includes a pair of longitudinally extending housings 37 and 38 in longitudinal alignment with the housings 35 and 36, respectively, and projecting rearwardly therefrom. It will be noted from Figures 3 and 7 that the housings 37 and 38 extend outwardly at the sides beyond the side edges of the base portion 31 of the casting 30, thereby defining a pair of side recesses beneath the housings 37 and 38. The casting also includes an upstanding work locating block 39, which is of generally T shape, as viewed in plan in Figure 3, and a pair of reinforcing ribs 40 and 41 extending between the work supporting member 39 and the bosses 33 and 34, respectively. The work supporting member, or block, 39 is provided with two right angle notches in its forward corners, as best shown in Figure 3, to receive a pair of workpieces 44. Suitable hardened steel wear plates 45 are secured to the sides of the right angle notches to form the workpiece locating surfaces.

Figures 7, 8, 9, 10, 11:
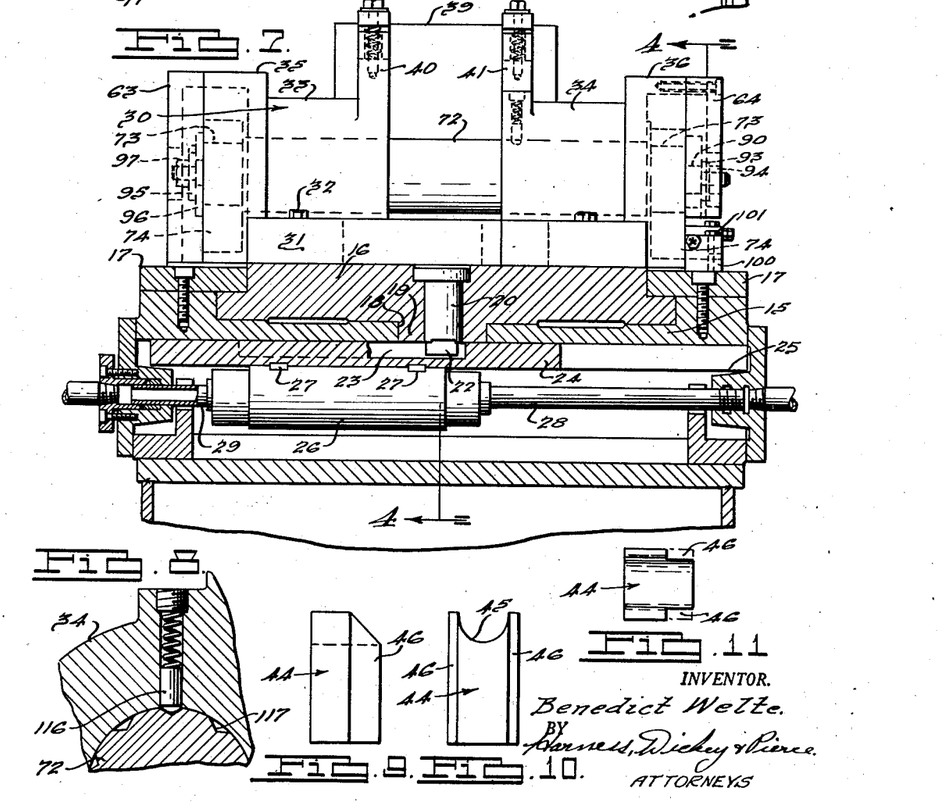
Figure 7 is a view taken on the line 7—7 of Figure 4.
Figure 8 is a fragmentary section taken on the line 8—8 of Figure 3.
Figures 9, 10 and 11 show the form of workpiece for which the particular embodiment of the invention illustrated is constructed.

The workpiece, as best shown in Figures 9, 10 and 11, is of generally rectangular configuration except that it has an arcuate or semicircular groove 45 in its upper surface. The particular operation to be performed on the workpiece by the machine illustrated is a notching operation in the forward corners to form notches 46, the metal to be removed being indicated by the dotted lines in Figure 11.

Each workpiece is held in position after it is seated against the wear plates 45 by means of a clamp 48, of generally right angle configuration with its downwardly extending leg 49 arcuately curved to fit the semicircular groove, or channel, 45. The clamp is held in position by means of a stud 50 secured in the bottom of a recess 51 in the top of member 39 and extending through a suitable opening in the clamp 48. The clamp is tightened by means of a nut 52 and a spring 53 surrounds the stud and tends to urge the clamp upwardly to facilitate release thereof.

It will be understood that the present invention is not limited in its application to the particular operation illustrated or to any particular form of workpiece, and that suitable means may be provided to hold any form of workpiece on the broaching machine.

Fixed to the upright portion of the frame of the machine at each side of the broaching slide are fixed abutments 56 which may be held in position in any suitable manner, as by bolts 57. One of the fixed abutments 56 has a longitudinal opening 58 extending therethrough in which is slidably mounted a push rod 59, for a purpose hereinafter described.

When the table 16 advances with the work supporting fixture, one end of each of a pair of rods 60 carried by the fixture is adapted to abut against the fixed abutments 56, respectively, and limit further movement of the table and workpiece toward the broach.

Figure 4:
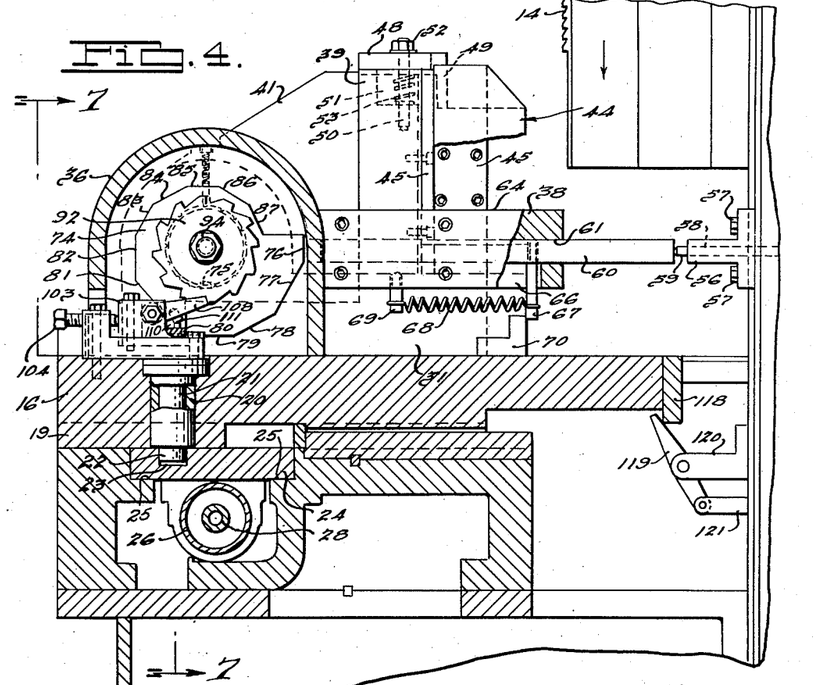
Figure 4 is a sectional view, the upper portion of which is taken on the line 4—4 of Figure 3 and the lower portion of which is taken on the center line of the machine as indicated by the line 4—4 in Figure 7.

The rods 60 are rectangular in cross section and are slidable in rectangular slots 61 in the housings 37 and 38 of the fixture casting 30. The slots 61 in the housings 37 and 38 are closed by means of a pair of plates 63 and 64, the forward ends of which are enlarged to complete the walls of the housings 35 and 36, respectively. The bottoms of the slots 61 are provided with suitable slots 66, as best shown in Figure 4, to receive pins 67 which are fixed, respectively, in the rods 60. Coil springs 68 connect the pins 67 to stationary pins 69, thus normally urging the pins 67 and, consequently, the rods 60 to the left, as viewed in Figure 4, the slots 66 permitting such movement.

A pair of stationary stops 70 secured to the stationary retaining plates 17 limits maximum movement of the pins 67 and rods 60 to the left, as viewed in Figure 4, to the position shown in that figure. In this position, the rods 60 are out of contact with the abutments 56, thus permitting the push rod 59 to project from its abutment 56.

Means are provided on the fixture for automatically controlling the position of the rods 60 in order to limit movement of the work table toward the broach. The means includes a relatively heavy shaft 72 journaled in the two bosses 33 and 34 extending transversely to the table 16. The ends of the shaft 72 project into the housings 35 and 36, where they are reduced in diameter, as indicated at 73, and receive a pair of rotatable abutment elements 74. The two abutment elements, which are identical in construction, are keyed to the shaft 72 by means of a key 75 and are peripherally formed of a plurality of stepped flat surfaces 76, 77, 78, 79, 80, 81, 82, 83, 84, 85, 86 and 87, circumferentially distributed in sequence around the periphery and of progressively decreasing distance from the axis of the shaft 72. The surfaces are so arranged that upon rotation of the shaft 72 any one of the flat surfaces 76 to 87, inclusive, may be brought into position to abut against the ends of rods 60. In this connection, it will be noted that the rods 60 extend in a line intersecting the axis of the shaft 72 and, consequently, no pressure exerted between the rods 60 and any one of the surfaces 76 to 87, inclusive, will have a tendency to rotate the abutment elements 74.

The right-hand end of shaft 72, as viewed in Figure 7, beyond the rotatable abutment element 74 thereon, is still further reduced in diameter, as indicated at 90, to receive a ratchet wheel 92, shown best in Figure 4. The ratchet wheel is locked in position on the shaft 72 by any suitable means, such as washer 93 and a nut 94, which is threaded on the extremity of the shaft 72. The opposite end of the shaft 72 is not provided with a corresponding ratchet wheel, but the abutment element 74 on the opposite end is held against displacement by a pair of washers 95 and 96 and a nut 97 on the end of shaft 72.

Means are provided for engaging the ratchet 92 and automatically indexing the shaft 72 on each reciprocation of the work table 16. This means includes an L-shaped block 100 fixed in any suitable manner, as by cap screws 101, to the right-hand stationary retaining plate 17 on one side of the right-hand edge of housing 36. Slidably mounted on block 100 is a pawl carrier 103 which may be adjusted in position longitudinally of the plate 17 by means of an adjusting screw 104 threaded in the upstanding leg of the L-shaped block 100. The pawl carrying block 103 may be held in adjusted position by means of a stud 105, which extends through a slot 106 in the pawl carrier 103 and is secured in the block 100.

The pawl 108 is pivoted on member 103 by means of a stud 109 held in position by a pair of nuts. The pawl 108 lies in a recess 110 formed on the inner side of the pawl carrier 103. A suitable spring 111, shown best in Figure 4, is provided for normally urging the pawl in an upward direction to engage the ratchet wheel 92. It will be apparent that as a result of this construction when the table 16 withdraws from the broach the pawl 108 will engage a tooth of the ratchet wheel and index the ratchet wheel one notch in a counterclockwise direction, as viewed in Figures 4, 5 and 6.

The cover plate 64 for the housing 36 is cut away at 112 to make room for the block 100 and pawl carrier 103 when the table withdraws from broaching position to the position shown in Figure 4. As best shown in Figure 8, a spring pressed detent 116 is provided in boss 34 and is adapted to engage in any one of a plurality of notches 117 in the shaft 72 for retaining the shaft against accidental displacement from any one of its plurality of indexed positions. One notch is provided for each of the flat surfaces 76 to 87, inclusive, on the rotatable abutment members 74.

The mechanism operates in the following manner. The starting position of the machine is illustrated in Figure 4, in which position the work table 16 is fully withdrawn from broaching position and the ratchet pawl 108 has just completed indexing of the rotatable abutments 74 to return them to the position they assume at the start of the broaching cycle. In that position, flat surfaces 76 on the abutments 74 are in position to engage the plunger 60 but are actually out of contact with the plunger by reason of the fact that movement of the plunger 60 to the left, as viewed in Figure 4, is limited by engagement between pins 67 and the stationary stops 70. In this position of the parts, a dog 118 on a rearward projection of the table 16 has engaged a lever 119, which is pivotally mounted upon a stationary bracket 120, and shifted the lever 119 in a counterclockwise position, thereby causing the lever to force the rod 121 to the right, as viewed in Figure 4. The rod 121 actuates a control valve, hereinafter described, which effects return of the broaching cylinder and broach to their upper or starting positions, shown in Figure 4.

As soon as the broach reaches its upper position, the machine automatically stops to permit insertion of the work in the fixture. When this is done, the machine is started and the first movement is a movement of the work table toward the broach. During such movement, the flat surfaces 76 on the rotatable abutments 74 engage the ends of the rods 60 and force the rods rearwardly against the stationary abutments 56, thereby limiting movement of the table toward the broach. In view of the fact that the table is driven by means of a hydraulic cylinder through self-locking cam groove 23, the cylinder will wedge the table in broaching position with the plunger 60 forced tightly against the stationary stops 56. Since the driving connection between the cylinder 26 and the table 16 is located centrally of the table and between the stationary abutments 56, the wedging action will positively prevent cocking of the table under any of the loads to which it is subject during the broach cutting operation.

Figure 5:
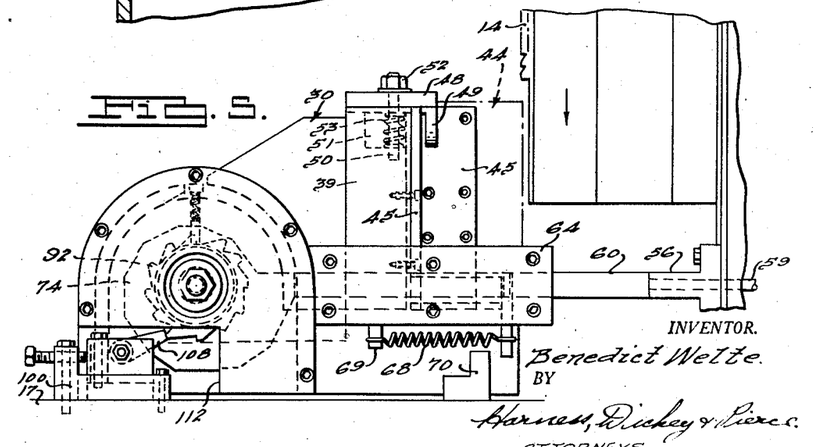
Figure 5 is a side elevation of the work supporting fixture and adjustable abutment mounted on the table.

Completion of this forward movement of the table will cause the push rod 59 in the stationary abutment 56 to be moved to the right, as viewed in Figure 4, to the position shown in Figure 5, and the push rod is connected to a suitable control valve, hereinafter described, which initiates the downward or broach cutting stroke of the broaching cylinder and broaches 14. The rod 59 is also mechanically connected to rod 121 in such a manner that upon movement of the rod 59 into its abutment 56 the lever 119 will be swung in a clockwise direction from the position shown in Figure 4, as hereinafter described in greater detail. On this first downward movement of the broaches, the broach cutting operation is performed on the workpieces. When the broaches reach the bottom of their downward and broaching stroke, suitable valve means are operated to move the cylinder 26 to the left, as viewed in Figure 7, in order to retract the table to the position shown in Figure 4. Upon such retraction, the pawl 108 indexes the rotatable abutments 74 to a position in which the flat surfaces 77 are in alignment with the rods 60.

The table return movement also returns lever 119 to the position shown in Figure 4, thereby causing return of the broaches to their upper position. The table then makes its second advancing movement, this time moving a slightly greater distance than before due to the fact that the flat surfaces 77 on the rotatable abutments 74 are spaced at a less distance from the axis of the shaft 72 than are the flat surfaces 76. Consequently, on repetition of the broaching stroke of the broaches 14 a further cut will be made in the workpieces. The cycle may repeat itself in this manner any desired number of times up to a maximum of twelve when the particular abutment means shown is employed.

On each retraction of the table 16, the rotatable abutments 74 are indexed, and on the subsequent advancing movement of the table it moves to a slightly greater extent toward the broach than on the previous stroke due to the fact that the successive abutment surfaces 76 to 87, inclusive, are a progressively less distance from the axis of the shaft 72.

With reference to the above statement that the cycle may be repeated, it should be noted that twelve (12) abutment surfaces are provided on the rotatable abutments 74. Accordingly, if two workpieces are simultaneously machined, twelve (12) or less complete broaching cuts may be made on each workpiece. It is, however, possible to operate the machine on a single workpiece at a time, taking a plurality of successive cuts on one broaching tool and then shifting the workpiece to the second fixture and completing the cycle on the second or finish broaching tool. The particular hydraulic circuit mechanism hereinafter described is designed to provide a two-stage broaching operation on a single workpiece at a time in that manner. Accordingly, the machine automatically provides a cycle of eleven (11) broaching strokes and then stops to permit the operator to shift the workpiece from one fixture to the other. Then, on restarting the machine it makes a single broaching cut on the work fixture with the finishing broach and again stops, whereupon the operator removes the finished workpiece and places a new workpiece in the first fixture, the parts then being in position to repeat the complete cycle.

It will be apparent that other variations in the sequence of operation of the machine may be made.

Figure 6:
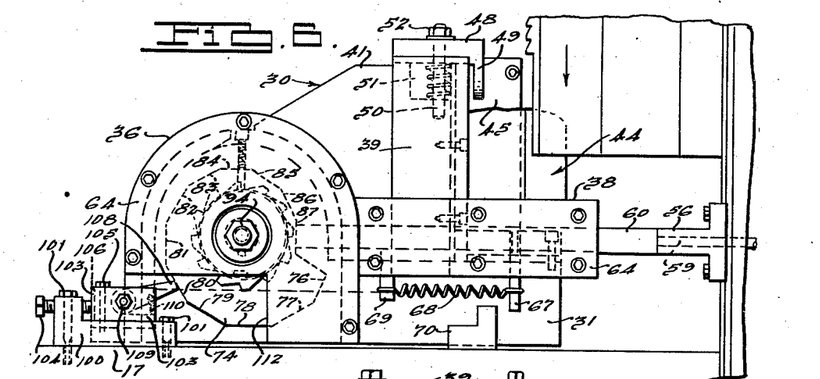
Figure 6 is a view similar to Figure 5, showing the parts in a different position.

Regardless of the manner in which the machine is utilized, it will be apparent that during the last broaching stroke the parts will be in the position illustrated in Figure 6, in which the flat surfaces 87 on the rotatable abutments 74 engage the rod 60. On withdrawal of the table from the position shown in Figure 6, which withdrawal completes the entire cycle of operation, the rotatable abutments 74 will be indexed in the position shown in Figure 4, in which figure all parts are shown in position to start a complete cycle. No claim is made herein to the mechanical features of the machine so far described, as such are claimed in the application of Harry H. Gotberg, Serial No. 491,149, filed June 17, 1943, now Patent No. 2,358,225, issued September 12, 1944. The present invention relates primarily to the hydraulic circuit, the circuit indexing features and the circuit control mechanism, shown best in Figures 12 to 15, inclusive. Any desired form of adjustable abutment mechanism may be employed with the circuit mechanism of Figure 12, although the mechanism shown in Figures 1 to 11 is preferred.

Figure 12:
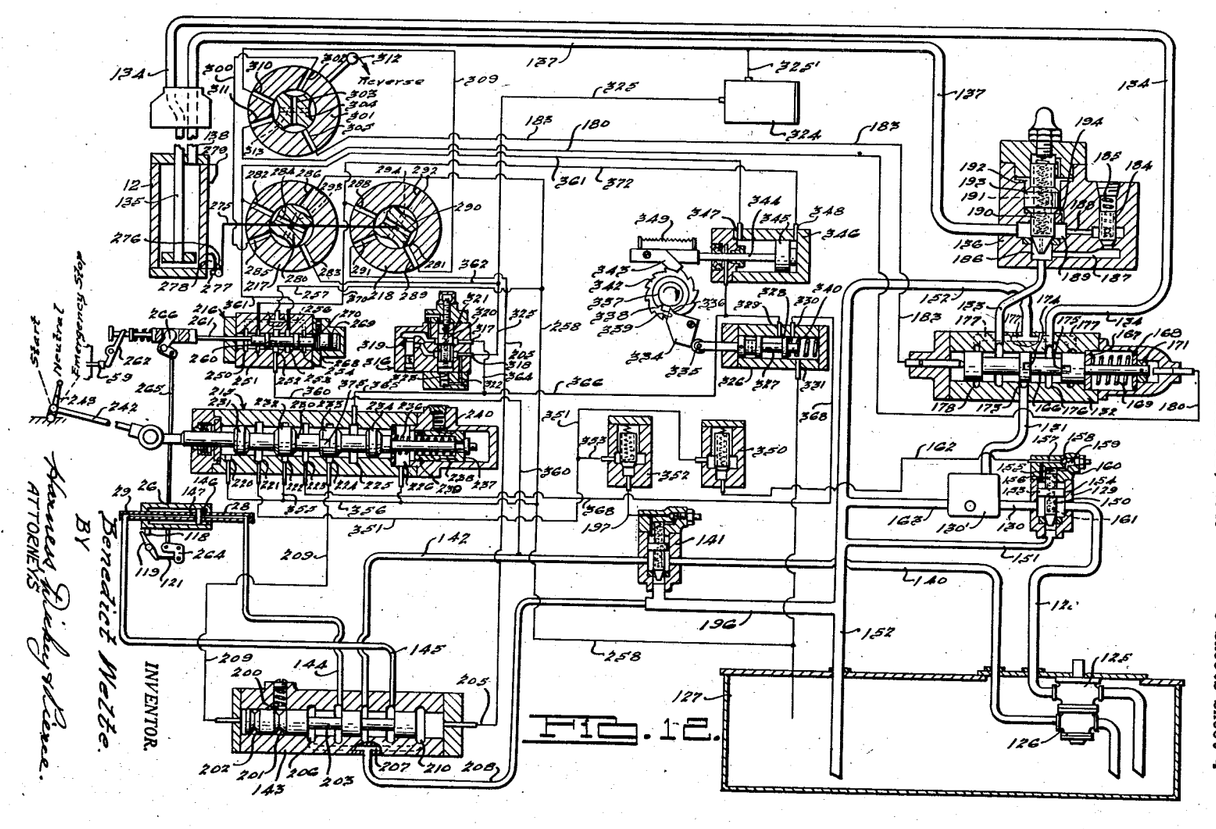
Figure 12 is a hydraulic circuit diagram showing the hydraulic circuit controls and cylinders provided to effect automatic operation of the machine through a complete cycle of broaching strokes.

In Figure 12 is shown one form of hydraulic circuit which is adapted to operate the machine automatically through eleven (11) successive cutting strokes and then stop the machine to enable the workmen to shift a workpiece from the roughing fixture to the finishing fixture. When the machine is then manually started on its finish broaching stroke, it completes that stroke and retracts the table and again automatically stops to enable removal of the finished workpiece and insertion of a new workpiece. The parts are then in the position to begin a complete new cycle of operation.

Referring to Figure 12, the main broaching slide cylinder is indicated at 12 and the cylinder for operating the table is indicated at 26. Fluid is supplied through suitable lines and valves to these two cylinders from a pair of pumps 125 and 126, which are located within a tank or fluid reservoir 127. Pump 125 supplies the broaching cylinder 12 through a line 128, a pilot control and overload by-pass valve 129, a line 130, a speed control valve 130', a line 131, and a pilot controlled four-way valve 132 which has a pair of lines 133 and 134 leading to opposite ends of the cylinder 12. Line 134 is connected directly to the lower end of cylinder 12 through the piston rod 135, while line 133 connects to a foot valve 136 which, in turn, is connected to the upper end of the cylinder 12 by a line 137 and an auxiliary piston rod indicated diagrammatically at 138. In the actual construction, the two piston rods 135 and 138 are concentric, and the fluid to the upper end of the cylinder flows between the two rods.

Fluid from the pump 126 flows through line 140 to a pilot controlled overload relief valve 141 and thence through line 142 to a pilot controlled four-way valve 143, which has a pair of lines 144 and 145 leading to the piston rods 28 and 29, respectively, of the cylinder 26. The fluid which flows through piston rod 28 passes into the right-hand end of the cylinder 26 through an opening 146, while the fluid flowing through the piston rod 29 flows into the opposite end of cylinder 26 through an opening 147.

The pilot controlled overload relief valve 129 provides a clear, unobstructed flow between lines 128 and 130, and the stem 150 of the valve normally closes the lower port, which is connected through line 151 and line 152 to the tank 127. The stem 150 is provided with a piston 153, which fits the valve housing and which is provided with a small bleed opening 154. Accordingly, the pressure in lines 128 and 130 which exists in the main chamber of the valve housing 129 is transmitted through the bleed opening 154 in the piston 153 to the upper chamber of the valve housing, thereby balancing the valve stem hydraulically. A light spring 155 holds the balanced valve in its lower position, in which it closes the port connected to line 151.

The space above the piston 153 is connected through a passage 156 and a connecting passage 157 to a ball check valve 158, which is normally held in position to block passage 157 by the action of a spring 159. If the pressure in lines 128 and 130 exceeds a predetermined amount determined by the setting of spring 159, the ball check valve 158 will open, thereby venting the fluid above piston 153 through a passage 160 and through an axial bore 161 in the valve stem to the tank lines 151 and 152. The flow of fluid through the bleed opening 154 is restricted; it cannot replace the fluid above the piston 153 as fast as it discharges to the reservoir past the check valve 158. Consequently, the pressure above the piston 153 will be less than that below the piston, and the valve stem will move upwardly, opening the port connected to line 151. This permits the fluid from pump 125 to discharge back to the tank at very low pressure.

The stem 150 of valve 129 may also be caused to raise at any time during the operation of the machine by connecting pilot line 162 to the tank 127 in the manner hereinafter described. When this occurs, the pressure above the piston 153 drops and the valve opens.

The valve 130' may be any suitable form of speed control valve. It is set to pass a desired portion of the fluid supplied to line 130 through line 163 to the tank line 152, in order to decrease the speed of the broaching stroke.

Except for its control upon the rate of flow of fluid to the main cylinder 12, the speed control valve 130' performs no function and can be omitted if desired, in which event line 130 would be connected directly to line 131.

The four-way valve 132 is of the spring centered type, the spool 166 being normally held in the position shown in the drawings by means of a spring centering device including a pair of washers 167 and 168 loosely fitting the stem of the valve spool and a spring 169 which surrounds the stem and bears against the two washers. Washer 167 is adapted to bear against the right-hand land of the valve spool 166, while washer 168 bears against sleeve 171, which is fixed to the valve stem. The washers also seat at their outer peripheries against shoulders formed on the valve casing.

When no pilot pressure is applied to either end of the valve the spring centering device shifts the valve spool to the positon shown, in which position fluid may flow from line 131 into the annular groove 173 and thence through notches 174 in the central land of the valve spool and thence through notches 175 in the right-hand land of the valve spool to channel 176, which communicates through a passage 177 with the tank line 152. Accordingly, no pressure is applied to line 134 in spite of the fact that it is in fluid communication with channel 173. The left-hand land of the valve spool blocks return flow from line 133 to the tank line 152, which is also connected by means of passageway 177 in the valve housing to annular channel 178.

When pilot pressure is applied to the right-hand end of valve 132 through pilot line 180, the valve spool is shifted to its left-hand end, during which movement sleeve 171 compresses spring 169. In its left-hand position, valve 132 permits flow of fluid under pressure from line 131 to line 134, inasmuch as the notches 175 in the right-hand land are shifted out of registry with the channel 176 when the spool is in its left-hand position. In this position the left-hand land of the valve spool clears channel 178, with the result that fluid from line 133 may return to the tank through channel 178, passageway 177 and tank line 152.

When pilot pressure is admitted to the left-hand end of valve 132 through pilot line 183, the central land of the valve spool shifts to the right of channel 173, permitting flow of fluid under pressure from line 131 to line 133. Channel 178 remains closed by the left-hand land of the valve spool, and the right-hand land of the valve spool clears channel 176, thus permitting return flow from line 134 through channel 176 and passageway 177 to the tank line 152.

The foot valve 136 contains a spring pressed check valve 184 which is normally held closed by a light spring 185, in consequence of which a relatively free flow of fluid is permitted through valve chamber 186, passageway 187, past check valve 184, through passageway 188 and valve chamber 189 to line 137.

Communication between valve chambers 189 and 186 is normally closed by means of the valve spool 190, which is held in its lower position by means of a spring 191 positioned within the hollow valve spool. The valve contains a third chamber 192, which is fitted by a piston 193 on the valve spool 190, and a small bleed opening 194 connects chambers 189 and 192 at a point beneath the piston 193 in the latter chamber. As a result of this construction, when line 133 is connected to the tank line 152 by valve 132 the pressure in line 137 from the upper end of cylinder 12 will be communicated from chamber 189 through the bleed opening 194 to the lower portion of the chamber 192 beneath piston 193 and tend to raise the valve spool. However, the spring 191 is so set that it will hold the valve spool closed against that pressure in line 137 caused by the weight of the broaching slide but will permit the spool to raise and open the valve at a slightly higher pressure. This prevents the slide from falling by its own weight during the broaching stroke if, for any reason, the resistance to its downward movement decreases sufficiently to permit it to so fall.

When the machine is not in the broaching or return strokes of its cycle, valve 132 assumes its mid position shown in the drawings and thereby blocks return of fluid from line 133. This also prevents the cylinder 12 from falling by gravity under these conditions.

The pilot controlled overload relief valve 141, which connects lines 140 and 142, is identical in construction and mode of operation to the valve 129, previously described, and hence will not be described in detail.

It is sufficient to note that the valve 141 always permits free flow from line 140 to line 142; but if the pressure in lines 140 and 142 exceeds a predetermined amount, the valve spool will open, permitting discharge of the fluid under pressure through line 196 to the tank line 152. The spool of valve 141 may also be opened at any time during the cycle of operation by connecting pilot line 197 to the tank in the manner described in connecttion with valve 129.

Four-way valve 143 is generally similar to four-way valve 132 except that the spool of valve 143 is not spring centered but, on the contrary, is held in either one of its two extreme end positions by means of a spring pressed detent 200 which engages in either one of the pair of notches 201 and 202 in the valve spool.

When pilot pressure is admitted to the right-hand end of valve 143 through pilot line 205, the spool is shifted to its left-hand position, shown in the drawings, in which position fluid under pressure from line 142 flows between the central and right-hand lands on the valve spool to line 145 and thence to the left-hand piston rod 29 of the work table moving cylinder. At this time, fluid from the right-hand piston rod 28 of the work table moving cylinder returns through line 144 and the space between the left-hand and central lands of spool 203 to channel 206, which connects through a passageway 207 to a line 208. Line 208, in turn, connects through line 196 to the tank line 152.

When pilot pressure is admitted to the left-hand end of valve 143 through pilot line 209, valve spool 203 is shifted to its right-hand position, in which position fluid under pressure from line 142 flows between the central and left-hand lands of the spool 203 to line 144. Return flow through line 145 passes between the central and right-hand lands to channel 210, which connects with passageway 207 and tank line 208.

When there is no pilot pressure applied to either end of valve 143, the valve spool is held against displacement from the position it last assumed by means of the spring pressed latch 200.

Operation of the above described main control valves to effect an automatic cycle of operation of the machine is accomplished through a pilot controlled valve system which includes three main control valves and a number of auxiliary valves. The three main control valves are the manually operated control valves 215, a table operated pilot valve 216 for controlling the operation of the main broaching cylinder 12, and a dual broaching slide controlled pilot valve 217—218 for controlling the operation of the work table.

The manual control valve 215 comprises a generally cylindrical body having a central bore provided wtih a plurality of axially spaced, circumferential grooves 220, 221, 222, 223, 224, 225 and 226. The grooves 220 and 226 are simply to accommodate drainage, and have no function except to dispose of fluid which leaks past the end lands on the valve spool. Slidable within the central bore is a valve spool 230, which is provided with four lands 231, 232, 233 and 234. The spool is normally held in the central or neutral position shown in the drawings by means of a spring 236, which bears at one end against the bottom of a cup-shaped sleeve 237 fixed to the right-hand end of the spool and at the other end against a washer 237' which loosely surrounds the valve stem.

The outer periphery of the sleeve 237 has an annular wide recess 238 and a second narrow annular recess 239. A spring pressed plunger 240 is normally urged into one or the other of the recesses 238 and 239. The spool is shifted by means of an operating rod 242, which is connected to an operating handle 243 pivoted in a convenient place on the frame of the machine. When no pressure is applied to the handle 243, the spring 236 shifts the sleeve 237, and consequently the spool 230, to the position shown in the drawings in which a spring pressed plunger 240 engages the left-hand edge of the wide annular recess 238. When the handle 243 is shifted to the left to start the machine, the valve spool is shifted by an amount equal to the width of the annular recess 238, with the result that when the operator releases the starting handle the spool is returned to its neutral position by spring 236. If the handle 243 is shifted in a right-hand direction from the neutral position, the spring pressed plunger 240 will engage in the annular recess 239 and retain the spool in its right-hand position until it is returned by operation of the handle 243.

The table controlled pilot valve 216 has a generally cylindrical body having a central bore in which is provided a plurality of annular channels 250, 251, 252, 253 and 254. Channels 250 and 254 are connected by passageway 256 to a pilot line 257, which is connected, in turn, to a pilot line 258 extending to the tank 127. Valve 216 is provided with a spool 260 having a pair of lands. The spool 260 is operated by means of a rod 261, which is shifted in its left-hand direction, as viewed in the drawings, by means of a lever 262 pivoted on a stationary portion of the machine and operatively connected to the push rod 59 in the fixed abutment 56, shown best in Figure 4. Consequently, when the work supporting table moves into broaching position, push rod 59 will be shifted to the right, causing movement of the valve spool 260 into its left-hand position.

When the work supporting table is fully retracted from broaching position, as shown in Figure 12, dog 118 engages lever 119, which, in turn, shifts rod 121 to the right, rocking bell crank lever 264, which is pivoted on a stationary portion of the machine. Bell crank lever 264 operates a rod 265 which, in turn, operates a bell crank 266 in a clockwise direction. The upper arm of bell crank 266 is connected to the rod 261 by any suitable means, such as by projecting into a slot in the enlarged portion of rod 261, so that clockwise rotation of the bell crank will shift rod 261 and spool 260 to their right-hand position, shown in Figure 12. The valve spool 260 is provided at its right-hand end with a pair of grooves 268 and 269, which are adapted to receive a spring pressed plunger 270 which operates to retain the spool 260 in either one of its two adjusted positions.

The dual pilot valve 217 and 218 is, in reality, two separate valves mounted on a common operating shaft, indicated diagrammatically by the line 275. The operating shaft 275 carries a pair of fingers 276 and 277, which are adapted to be operated, respectively, by a pair of dogs 278 and 279 mounted upon the broaching slide 12. The fingers 276 and 277 are displaced from each other transversely of the axis of the cylinder 12, and the dogs 278 and 279 are likewise so displaced; so that the dog 278, which operates finger 276, will not engage finger 277, and dog 279, which operates finger 277, will not engage finger 276.

When the broaching slide 12 reaches its upper position, dog 278 engages finger 276 and rotates shaft 275 and, consequently, the rotary spools 280 and 281 of the valves 217 and 218 in a clockwise direction, to the position shown in Figure 12. With the spools 280 and 281 in the position shown in the drawings, fluid may flow through valve 217 from port 282 to port 283 through a passageway 284 in the valve spool while ports 285 and 286 are connected through passageway 293. At the same time, fluid will flow through valve 218 from port 288 to port 289 through passageway 290 in the valve spool and ports 291 and 292 are connected through passageway 294.

When the broaching slide 12 reaches its lowermost position, the dog 279 engages the finger 277 and rotates the shaft 275 and, consequently, valve spools 280 and 281 in a counterclockwise direction to a position in which the flow through valve 217 is from port 282 to port 285 and ports 283 and 286 are connected through passageway 293 in the spool. At the same time, the flow through valve 218 is from port 288 to port 291 and from port 289 through passageway 294 to port 292.

It will be observed that port 285 of valve 217 is connected to the pilot line 183 at the left-hand end of the four-way valve 132 by means of a pilot line 300 and a four-way reversing valve 301. The flow through the four-way reversing valve is normally from port 302 through passageway 303 in the rotatable valve spool 304 to port 305. It will also be observed that port 289 of valve 218 is connected to pilot line 180 at the right-hand end of the four-way valve 132 through a pilot line 309 and the four-way valve 301, the flow through the valve 301 being from port 310 to port 311 and thence to the pilot line 180. The four-way valve 301 is normally maintained in the position shown in Figure 12, but it will be observed that the pilot connections to the four-way valve 132 which control the direction of movement of the broaching slide 12 may be reversed by shifting the four-way valve 301 to the right by means of handle 312, thus connecting port 302 to port 311 through passageway 303 and connecting port 310 to port 305 through passageway 313. This provides a relatively simple means for reversing the broaching ram in the event that the machine jams or otherwise stops during the broaching stroke.

Valve 316 is a combination check and pressure release valve, the purpose of which is to insure that the upper end of the broaching cylinder 12 is filled and, therefore, the broaching cylinder is in its top position before the work moving table begins to advance toward the broach. To accomplish this function valve 316, while it permits free flow from port 317 to port 318 through the spring pressed check valve 319, prevents return flow from port 318 to port 317 until the spool 320 is raised from the position shown in the drawings. Spool 320 is normally held in its lower position by a spring 321, and in that position it blocks flow between port 317 and port 318 except as permitted by the check valve 319. When the pressure in port 318 exceeds a predetermined value, the fluid from port 318 which acts through passageway 322 on the plunger 323, raises the valve spool 320 against the action of spring 321, and permits flow of fluid from port 318 to port 317, under the circumstances hereinafter described.

Valve 324 is a check valve connected by lines 325 and 325' between the port 318 of valve 316 and the main fluid line 137 to the upper end of the cylinder 12. This check valve, which is similar in construction to valves 350 and 352, hereinafter described, permits free flow from line 325 to line 325' but prevents reverse flow. Valves 316 and 324 co-operate in a manner hereinafter described to prefill the upper end of cylinder 12 before the work table can advance to broaching position.

Valve 326 contains a spool 327 having a land 328 which controls communication between ports 329, 330 and 331. The position of the land 328 determines whether or not the machine will stop at the end of a broaching cycle or will repeat the broaching cycle automatically. In the position shown in the drawings, the land 328 blocks communication between ports 329 and 330 and hence will cause the machine to stop at the end of its broaching cycle. If, however, the spool 327 is shifted to the right, thus providing communication between ports 329 and 330, the machine will automatically repeat the broaching cycle until such time as the spool 327 is shifted.

The position of the spool 327 is controlled by an indexing mechanism including a dog 334, which is pivoted to a fixed portion of the machine and bears on a roller 335 on the stem of the valve spool 327. The position of dog 334 is controlled by engagement of a point 336 on the dog with the periphery of a disc 337. The disc 337 in the particular machine illustrated is provided with a pair of notches 338 and 339. A spring 340 bearing on the right-hand end of the valve spool 327 normally urges the spool to the left and, when the disc 337 is in position for the point 336 of dog 334 to fall into one of the notches 338 or 339, the spool 327 will shift to the position shown in the disc and cause stoppage of the machine. Disc 337 is fixed to a ratchet wheel 342 which, in turn, is actuated by a pawl 343 carried by the rod 344 of a piston 345 in a cylinder 346. Piston 345 is reciprocated once for each cycle of operation of the machine by the admission of fluid to the ports 347 and 348, in the manner hereinafter described. A spring 349 acts to hold the pawl 343 at all times in engagement with the ratchet 342.

As previously indicated, valves 141 and 129 may be opened at any time in the cycle by connecting their respective pilot lines 197 and 162 to the tank. Such valve opening is utilized to stop the machine in an emergency. Pilot line 162 is connected to channel 221 of valve 215 through a check valve 350 and a line 351, while pilot line 197 is similarly connected to the channel 221 in valve 215 by a check valve 352 which, in turn, is connected by line 353 to the line 351.

When the manual control lever 243 is shifted to the right to its emergency stop position, land 232 on the valve spool 230 shifts to the right of channel 222, thus permitting communication between channels 221 and 222. Channel 222 is connected by means of a line 355 and a line 356 to the tank pilot line 258. Consequently, when the valve spool 230 is shifted to the emergency stop position, fluid may flow freely through the check valves 350 and 352 from the respective pilot lines 162 and 197 to the channel 221 of valve 215 and thence through channel 222 and lines 355, 356 and 258 to the tank, thereby causing the valves 129 and 141 to open and relieve the pressure on the system. The check valves 350 and 352 open freely against relatively light spring pressure to permit such flow, but they will not permit flow in a reversed direction.

The operation of the hydraulic circuit is as follows. In Figure 12, all of the parts are shown in the position they assume at the end of a complete cycle of operation of the machine, at which time the machine is automatically stopped to remove a finished workpiece and place a new workpiece in one of the two work holding fixtures. Assuming that the pumps 125 and 126 are operating, there will be no pressure applied to the broaching cylinder 12 because the main control valve 132 for the broaching cylinder is in its central position, in which the pressure fluid supplied through line 131 flows to the tank through channel 173, notches 174, notches 175, channel 176, passageway 177, and tank line 152. The fluid trapped in the upper end of cylinder 12 by valve 132 will hold the broaching cylinder in its upper position against the force of gravity acting on the cylinder. The fluid under pressure from pump 126 will be transmitted through line 140, valve 141, line 142 and valve 143 to line 145 and thence to the left-hand end of the work cylinder 26 through piston rod 29. Since the work table will be at its extreme outer position and cannot move further, the pressure will build up to a point at which valve 141 will open, venting the pressure from line 140 to the tank through lines 196 and 152.

The setting of valve 141 is such that it limits the pressure in the left-hand end of cylinder 26 during these circumstances to a safe maximum pressure. If at any time the pressure drops below the maximum, valve 141 will automatically close. In the meantime, high pressure is maintained on line 142 and the left-hand end of cylinder 26.

The source of pilot pressure for the entire circuit is line 360, which is connected to line 142 which at all times is subject to the pressure developed by pump 126. Line 360 connects to channel 252 of valve 216. When the machine is stopped in the position shown in the drawings, the pressure from channel 252 is communicated from channel 253 and thence to a line 361 which, in turn, is connected to port 282 of valve 217. Line 361 is also connected to the left-hand end of cylinder 346, thus holding the piston 345 of the indexing mechanism in its right-hand position. The pilot pressure from port 282 of valve 217 is transmitted through passageway 284 to port 283 and thence through line 362 to the line 325, which extends between check valve 324 and port 318 of valve 316.

Since no flow can occur between ports 318 and 317 of valve 316 until the pressure has reached an amount determined by the setting of valve spring 321, the pilot pressure from line 362 will pass upwardly from line 325 through the check valve 324 to line 137 and thence to the upper end of the broaching cylinder 12 and help maintain the broaching cylinder in its uppermost position. If the machine is left with the pump motor shut off for a substantial length of time, leakage will permit the cylinder 12 to sink downwardly under the influence of gravity and, accordingly, if that has occurred the flow from line 362 through line 325 and check valve 324 will prefill the upper end of the cylinder and return the cylinder to its top position.

When cylinder 12 reaches its top position and can move no further, the pressure in the upper end of the cylinder in line 137, which acts on plunger 323 of valve 316 through passageway 322, will build up sufficiently to overcome the force of spring 321 in valve 316, thereby permitting the valve to open and provide communication between ports 318 and 317. Spring 321 is so adjusted, however, that the valve opening cannot occur until the upper end of cylinder 12 is entirely filled and the pressure increases in consequence of the fact that it can raise no further due to mechanical limitations.

When valve 316 opens, the pilot pressure then is transmitted from port 317 through line 364 to a line 365, which extends to channel 225 of valve 215. At this point, the fluid is blocked so long as valve 215 is in its neutral position illustrated in the drawings. Communication is also provided between pilot line 364 and port 329 of valve 326 by means of a line 366, but so long as the land 328 of valve 326 is in its stop position, illustrated in the drawings, the fluid in line 366 and port 329 is blocked and cannot flow to port 330 or line 368, which connects port 330 to channel 223 of valve 215. When valve 215 is in its neutral position, pilot lines 162 and 197 from valves 129 and 141, respectively, are also blocked at channel 221 of valve 215 and, consequently, the valves 129 and 141 will operate only as pressure relief valves. At this time there is no pressure on either pilot line 205 or 209 of valve 143 but the valve spool is retained in its left-hand position by the spring detent 200. Likewise, pilot lines 180 and 183 of valve 132 are connected to the tank.

The machine is started by shifting hand lever 243 to the left to its starting position. This shift moves valve spool 230 of valve 215 to the left, opening communication between channels 225 and 224 and allowing the pilot pressure in line 365 to flow through the valve to pilot line 209 at the left-hand end of four-way valve 143. This pilot pressure will immediately shift the valve spool 203 to its right-hand position. However, it should be noted that if the starting handle 243 is shifted to starting position before the cylinder 12 is fully raised, valve 316 will be closed, thus blocking communication between ports 317 and 318 and preventing any flow to the pilot line 365. Accordingly, valve 316 positively prevents a shift of four-way valve 143 until the broaching cylinder 12 is fully elevated by the flow of fluid through line 325, valve 324, line 325', and line 137. As soon as the spool of valve 143 shifts to its right-hand position, the fluid under pressure in line 142 is communicated through valve 143 to line 144 and thence to the right-hand end of the work moving cylinder 26 through the piston rod 28 and opening 146. This will cause the work table to advance the work into broaching position, which position will be determined by engagement of the flat surfaces 76 on the rotatable abutments 74 with the rods 60 which, in turn, engage the fixed abutments 56.

As soon as the work cylinder 26 and the table driven thereby begin to move, the operator may release the starting handle 243, whereupon spring 236 will return the handle and valve spool 230 to their neutral position, shown in the drawings. This will cut off the pilot pressure in pilot line 209 at the left-hand end of valve 143, but the spool 203 will remain in its right-hand position by reason of the engagement of the spring pressed detent 200 in notch 202.

Upon completion of the table advancing movement, push rod 59 will be moved to the right by the rods 60 and will shift the spool 260 of valve 216 to the left, thereby providing communication between channels 251 and 252. Pilot pressure will then flow from line 360 through valve 216 to line 370, which is connected to channel 251 and thence to port 288 of valve 218. From port 288, the pilot pressure flows through passageway 290 to port 289 and thence through line 309, port 310 of valve 301, port 311 of valve 301, and line 180 to the right-hand end of the four-way valve 132. The pilot pressure in pilot line 180 will shift the spool 166 of valve 132 to its left-hand position, thus connecting pressure line 131 with line 134 and connecting tank line 152 with line 133. The fluid under pressure in line 134 flows to the lower end of the broaching cylinder 12 and starts the downward or broaching stroke of the cylinder. During such broaching stroke the fluid in the upper end of the broaching cylinder returns through line 137, valve 136, line 133, valve 132, and the tank line 152. At this time, the return flow of fluid through line 137 will lift the spool 190 of valve 136 off its seat to permit the necessary return flow.

It should be noted that the pilot pressure in line 370 which effected the last mentioned shift of the spool in valve 132 was not only directed to the port 288 of the valve 218, but also, by a branch line 372, to the right-hand end of cylinder 346 through the port 348, thus causing the piston 345 to move to the left to retract the ratchet pawl 343.

It will also be observed that when the work table completed its movement and shifted valve spool 260 of valve 216, it caused a rocking movement of bell crank 266 in a counterclockwise direction, thus returning the lever 119 to its right-hand position by reason of a connecting rod 265, bell crank 264, and rod 121.

Throughout the broaching stroke, fluid under pressure from pump 126 will be maintained in the right-hand end of the work moving cylinder 26 even though the pilot pressure at the left-hand end of valve 143 is eliminated as the result of the shift of spool 260 in valve 216 as well as the return of the starting handle to neutral position. This is due to the fact that the spool 203 of valve 143 will be held in its right-hand position by engagement of the spring pressed detent 200 in the notch 202, there being no pressure in either of the pilot lines 205 and 209 of valve 203 during the broaching stroke. Accordingly, the work fixture will be held in position by the full operating pressure acting through the cam slot 23. The angle of the cam slot 23 is such that the pressure in the cylinder 26 required to hold the table in broaching position against the maximum force exerted by the broach is less than the pressure required to shift the spool of valve 132 against the centering spring 169. Consequently, the spool 166 will shift to its central position and stop the broaching stroke if for any reason the pressure drops to a point where it is insufficient to hold the table in broaching position.

On completion of the broaching stroke of cylinder 12, dog 279 engages finger 277 and rotates the spools of valves 217 and 218 in a counterclockwise direction to a position in which the pilot pressure then existing in line 370 (spool 260 of valve 216 being in its left-hand position) flows through port 288 of valve 218 to port 291 of that valve and thence to the pilot line 205, which is connected at the right-hand end of four-way valve 143. The pilot pressure in line 205 will return the spool 203 of valve 143 to its left-hand position, shown in the drawings, thus causing the fluid under pressure from line 142 to pass through valve 143 to the line 145 and through piston rod 29 and opening 147 to the left-hand end of the work moving cylinder 26, thereby causing the work moving cylinder to retract the work table until the cylinder assumes its fully retracted position, shown in the drawings.

Upon completion of the retraction of the work moving cylinder 26, dog 118 engages and shifts lever 119 to the position shown in the drawings, thereby returning spool 260 of valve 216 to its right-hand position illustrated. In that position, the pilot pressure in line 360 is transmitted through valve 216 to line 361 and thence through port 282 of valve 217, port 285 of valve 217, line 300, port 302 of valve 301, passageway 303, and port 305 to pilot line 183, which is connected to the left-hand end of the four-way valve 132.

The pilot pressure in line 183 shifts the spool 166 of valve 132 to its right-hand position, in which fluid under pressure from line 131 passes to line 133 and thence through valve 136 and line 137 to the upper end of the broaching cylinder 12 to cause the broach returning movement. The flow at this time through the valve 136 is from chamber 186 through passageway 187 past the check valve 184 and through passageway 188 and chamber 189. During the broach returning movement, the fluid in the lower end of the cylinder 12 returns through line 134 and the valve 132 to the tank line 152.

At the time the broach returning movement is initiated, the pilot pressure then existing in line 361 is not only transmitted to port 282 of valve 217, but also through branch line 361 to the left-hand end of the indexing cylinder 346, thereby causing the piston 345 to move to the right, carrying its ratchet pawl 343. This right-hand movement of the pawl 343 returns the pawl and piston 345 to the position shown in the drawings and causes the ratchet wheel 342 and disc 337 to rotate clockwise one notch. This rotation of the disc 337 retracts the notch 339 out of engagement with the point 336 on pivoted disc 334, thereby causing the dog to swing in a counterclockwise direction and shift valve spool 327 of valve 326 to the right, thus providing communication between ports 329 and 330. As will hereafter become apparent, as long as ports 329 and 330 are in communication with each other the machine will automatically repeat its cycle of operations indefinitely.

As soon as broaching cylinder 12 reaches the top of its return stroke, dog 278 engages finger 276, thereby rotating shaft 275 and spools 280 and 281 of valves 217 and 218 in a clockwise direction, returning then to a position shown in the drawings. Pilot pressure then existing in line 361 may then flow from port 282 of valve 217 through passageway 284 to port 283 and thence through line 362 to line 325. Assuming that the cylinder 12 is in its extreme upward position, the fluid pressure in line 325 will then open valve 316, permitting a flow of fluid from port 318 to port 317 and thence through line 364 to line 366. The pilot pressure in line 366 is transmitted to port 329 of valve 326 and thence to port 330 (land 328 having been shifted to the right) from which it flows through line 368, channel 223 of valve 215, notches 375 in land 233 of the valve spool 230 to channel 224, which communicates with the pilot line 209 for the left-hand end of four-way valve 143. This pilot pressure in line 209 will shift the spool 203 to its right-hand position in order to initiate the work table advancing movement of cylinder 26, thus beginning a new cycle automatically.

The new cycle will follow through in the manner previously described and the piston 345, during such cycle, will operate to advance the pawl 343 and ratchet wheel 342 through one additional notch in a clockwise direction. The cycle will continue to repeat itself with the particular construction shown eleven (11) times, or until the point 336 on pivoted dog 334 drops into notch 338 in the disc 337. This will occur during the eleventh broach returning movement, and will cause the spool 327 of valve 326 to shift to the left, into the position illustrated in the drawings, in which position it blocks communication between ports 329 and 330. When the eleventh broach returning movement is completed, all of the parts of the hydraulic circuit except the ratchet wheel 342 and disc 337 will be returned to the position shown in the drawings, in which position the machine will stop because spool 230 of valve 215 blocks the passage of pilot pressure from line 365 to pilot line 209 for the left-hand end of four-way valve 143.

During the first eleven complete cycles of operation, the work table will have moved on each advancing stroke a slightly greater distance toward the broach than on the preceding advancing stroke, as the result of the action of the surfaces 76 to 86, inclusive, on the rotatable abutments 74. At the end of the eleventh cycle of operation, the surfaces 87 on the rotatable abutments 74 will be in alignment with the rods 60 but out of engagement with the rods because of the fact that the table will be retracted. Since the machine is stopped at this point, the operator may then shift the workpiece from the roughing fixture to the finishing fixture and, having done so, he may again shift the lever 243 to its starting position. The machine will then make a complete cycle of operation and again come to the stop, due to the fact that the ratchet wheel 342 will have returned to the position shown in the drawings, in which the point 336 of pivoted dog 334 rests in notch 339 of disc 337. At this stage, the finish broaching operation will have been completed and all of the parts will have been returned to the positions shown in Figure 12. The finished workpiece may then be removed from the machine and a new one inserted, and the machine is ready to begin a complete new cycle of operation.

It will be observed that if the line 364 were connected directly to pilot line 209, the machine would operate continuously without stopping. Instead, line 364 is connected to line 209 through two parallel routes, each containing a valve. One route is through the starting valve 215 which blocks flow from line 364 to line 209 except when the handle 243 is held in its starting position. The other route is through the index valve 326 and valve 215. As long as the starting valve 215 is in its normal position shown and the pivoted dog is not engaging in a notch in disc 337, index valve 326 and starting valve 215 permit free communication from line 364 to line 209 and the machine operates continuously. When the dog drops into a notch in disc 337, valve 326 blocks communication and the machine stops at the end of the broach return movement.

It should also be noted that when the valve 326 blocks communication from line 364 to line 209 it connects line 209 to the tank. This is necessary in order to permit a shift of the spool of valve 143 to the left when both of the valves 215 and 326 are in the position shown in the drawings. This situation arises during the first cycle after the machine is started by manually operated valve 215 and the dog 334 is in a notch in disc 337. The connection from line 209 to valve 326 is made through valve 215 in order that the connection can be blocked when valve 326 is in its stop position shown and valve 215 is shifted to its starting position. Otherwise at that time line 209 would be connected to the tank by valve 326 and no pilot pressure would build up in line 209 to shift valve 143.

Figure 13:
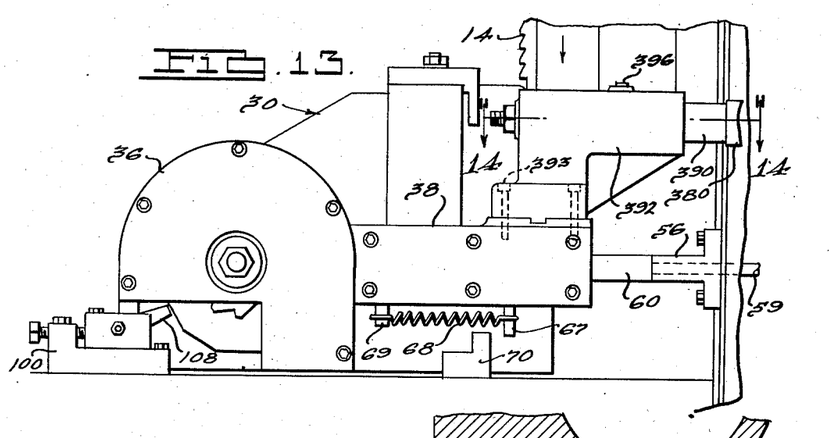
Figure 13 is a view corresponding to Figure 5, showing a modification of the invention incorporating means for effecting a full length stroke of the broaching ram only on the finishing stroke of the cycle.

In multiple stroke broaching machines of the type to which the present invention relates it is desirable to perform the preliminary or roughing cuts on the work without permitting the finishing teeth of the broach to contact the work. Then, following the roughing cuts, a single finishing stroke of greater length is made during which time the finishing teeth perform their finishing operation. This arrangement saves wear and tear on the finishing teeth and enables the broach to cut to correct depth for a substantially longer period of time. Accordingly, there is provided, as best shown in Figures 13 to 15, an attachment which may be incorporated in the machine previously described in order to effect this result.

Figures 14, 15:
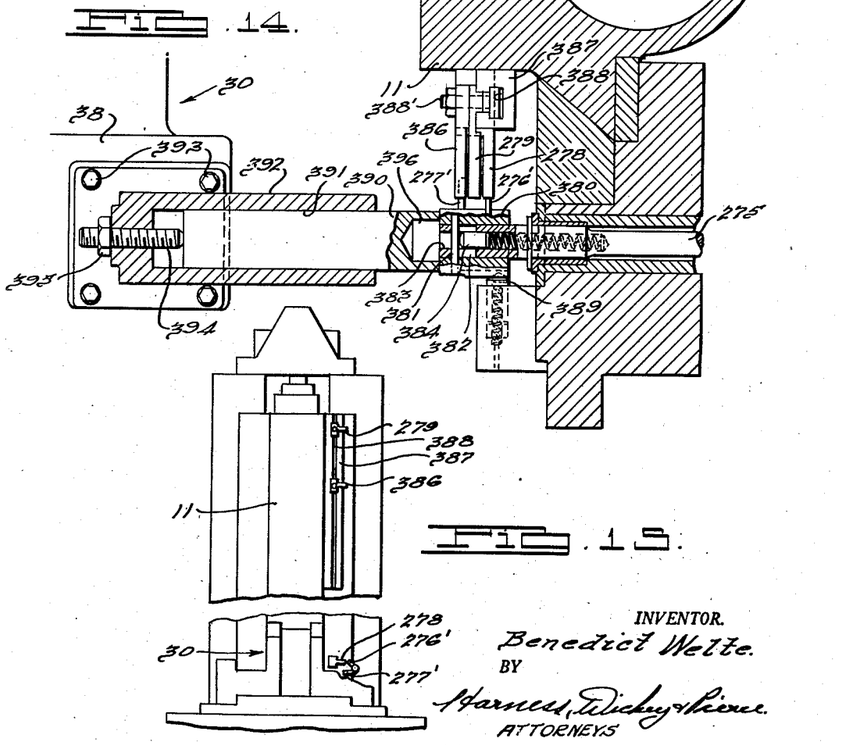
Figure 14 is a fragmentary sectional view taken on the line 14—14 of Figure 13.
Figure 15 is a partial front elevation of the machine, showing the location of the trip dogs on the main broaching ram with part of the work fixture broken away to show the lower trip dog.

Referring to Figure 14, there is shown the shaft 275 which, as indicated diagrammatically in Figure 12, controls dual valve 217—218. In the machine of Figures 1 to 12, shaft 275 has fixed thereto a pair of fingers 276 and 277 adapted to be operated by the trip dogs 278 and 279 on the main broaching ram. In the modified construction similar trip dogs 278 and 279 are provided, as best shown in Figures 14 and 15, for operating corresponding fingers 276' and 277'. However, the fingers 276' and 277', instead of being fixed to the valve shaft 275, are formed upon a boss 380, which is secured to the shaft by means of a pin 381 press fitted into the boss 380 and extending through a slot 382 formed in the shaft 275 near its forward end. The forward end of the shaft 275 in the modified construction is provided with an axial bore 383, and a spring pressed plunger 384 slidable within the bore engages the central portion of the pin 381 and normally holds the boss 380 in its outermost position, in which position the finger 276' is in position to be engaged by the trip dog 278, but the finger 277' is displaced forwardly of the path of movement of the trip dog 279 and lies in the path of movement of a third trip dog 386.

The trip dogs 278, 279 and 386 are secured to the face of the ram in the usual manner; that is to say, the trip dog 278 is secured to the face of the ram near its lower end, while the trip dog 279 is slidably fixed in a bar 387 secured to the ram. The trip dog 279 is secured to the bar by means of a T-slot 388 formed in the bar and a cooperating T-bolt 388' extending through the dog with its head in the T-slot. As a result of this arrangement, the position of the trip dog 279 can be adjusted in order to adjust the length of the broaching stroke.

The additional trip dog 386 provided in the modified construction is likewise secured in the T-slot 388 of the bar 387 in the same manner, but is located a point below the trip dog 279. As a result of this arrangement, during the roughing strokes the auxiliary trip dog 386 will engage the finger 277', thus shifting the dual valve 217—218 of Figure 12 and thereby bringing the ram to a stop and starting the work withdrawal stroke of the table, in the manner previously described in connection with Figure 12. Trip dog 386 is so positioned that the stoppage of the ram will occur just before the finishing teeth of the broach engage the work.

As is the usual practice, a spring pressed plunger 389 carried by a stationary portion of the machine is adapted to engage in a pair of slots in the boss 380 to hold the boss against accidental displacement from either of its two rotative positions.

The machine will thus continue to operate automatically through the desired number of roughing strokes in the manner previously described, during which time the work table will be fed toward the broach to a greater degree before each succeeding stroke until during the last roughing cut of each complete cycle the work fixture 30 occupies the position shown in Figures 13 and 14, in which position the extremity of a cylindrical bar 390 fixed to the work fixture engages the end of the boss 380 in the manner illustrated in the drawings.

The bar 390 is fixed in a bore 391 of a bracket 392, which, in turn, is secured by cap screws 393 to the top of one of the longitudinally extending housings 38 of the work fixture 30. The position of the bar 390 may be adjusted within the bore 391 by means of a stud 394 which may be located in the desired position by a nut 395, and the bar is held against displacement from the adjusted position by means of a set screw 396, shown in Figure 13. The rod is so adjusted that during the last roughing cut the bar 390 will just contact the boss 380 carrying the fingers 276' and 277' without displacing the boss to the right, as viewed in Figure 14. However, on completion of the last roughing cut and prior to the finishing stroke of the machine the work table will be retracted and again advance, this time to a greater extent than that indicated in Figures 13 and 14. During this further advance the bar 390 will engage boss 380 and shift the boss to the right until the trip finger 277' is out of the path of trip dog 386 and in the path of trip dog 279. It will be noted that the outer end of the bar 390 is provided with a bore 396 to accommodate the end of shaft 275 during this movement of the boss 380.

As a result of this shift of the boss 380, the broaching ram will make a complete stroke, thus carrying the finishing teeth of the broach past the work for the first time, and stoppage of the ram will be effected by engagement of the trip dog 279 with the finger 277'. Upon completion of the finishing stroke the work table will be again retracted in the manner previously described, thereby permitting the boss 380 to return to the position shown in Figures 13 and 14. Consequently, when the ram makes its broach return stroke the trip dog 278 will engage finger 276' and bring the machine to a stop at the end of the complete cycle.

It will be apparent that the modification of Figures 13 to 15 may be applied to the machine of Figures 1 to 12 without any change in the construction except with respect to the mounting of the trip fingers on the shaft 275 and the provision of the additional trip dog 386 on the ram. With this attachment the machine previously described will operate to make the complete broaching stroke only on the finishing stroke of the cycle. This result is achieved quite independently of the number of strokes in the broaching cycle. It will be obvious, however, that this feature is required only when the complete broaching cycle is performed upon the workpiece by the same broach. Thus it is not required if a special finishing broach is provided on the ram and the work is shifted upon completion of the roughing cuts into a position in which it will engage the finishing broach. Accordingly, when the attachment of Figures 13 to 15 is employed, the machine of Figures 1 to 12 will perform the complete broaching cycle on two workpieces simultaneously and the notch 338 provided in the disc 337 of Figure 12, which brings the machine to a stop upon completion of the roughing stroke, may be omitted. The attachment, therefore, has the effect of doubling the productive capacity of the machine.

It will be apparent that there is provided in accordance with the present invention an improved and simple hydraulic indexing circuit, particularly adapted for use in a machine for making a plurality of successive broaching cuts in a single workpiece. While only a single embodiment of the invention is shown and described, it will be apparent that others are available within the spirit of the invention and the scope of the appended claims.

What is claimed is:

1. In an automatic multiple stroke hydraulic broaching machine, a broaching ram, a reciprocating work fixture, hydraulic means for automatically operating the ram and fixture through a plurality of broaching cycles each including in succession an advance of the fixture to broaching position, a broaching stroke of the ram, withdrawal of the fixture from broaching position and return of the ram, means for causing the fixture to advance to a greater extent toward the broach on each of said plurality of cycles, said hydraulic means including control valve means adapted when shifted in one direction to bring the ram to a stop when it is moving in its broaching direction and to institute withdrawal of the fixture, a movable element for shifting said valve means in said direction, a cooperating element carried by the broaching ram and normally adapted to engage said first element during movement of the ram in broaching direction and thereby shift said valve means in said direction before the finishing teeth of the broach have engaged the work, means on said fixture for engaging one of said elements and shifting it in a direction to prevent engagement with the other element when the fixture has moved a predetermined distance toward the broach, and means operable to engage said movable element and thereby shift the valve means in said direction when the finishing teeth of the broach have passed over the work.

2. In an automatic multiple stroke hydraulic broaching machine, a broaching ram, a reciprocating work fixture, hydraulic means for automatically operating the ram and fixture through a plurality of broaching cycles each including in succession an advance of the fixture to broaching position, a broaching stroke of the ram, withdrawal of the fixture from broaching position and return of the ram, means for causing the fixture to advance to a greater extent toward the broach on each of said plurality of cycles, said hydraulic means including control valve means adapted when shifted in one direction to bring the ram to a stop when it is moving in its broaching direction and to institute withdrawal of the fixture, a movable element for shifting said valve means in said direction, a pair of trip dogs fixed to the ram for movement therewith in parallel paths, said element being normally in the path of movement of one of said dogs whereby said dog will engage the element during movement of the ram in broaching direction and thereby shift said valve means in said direction, said one dog being so located along the length of the ram as to engage the element before the finishing teeth of the broach engage the work, and means on said fixture for engaging said element and shifting the same out of the path of movement of said one dog into the path of movement of the other dog when the fixture has moved a predetermined distance toward the broach, said other dog being so located along the length of the ram as to engage the element when the finishing teeth of the broach have passed over the work.

3. In an automatic multiple stroke hydraulic broaching machine, a broaching ram, a reciprocating work fixture, hydraulic means for automatically operating the ram and fixture through a plurality of broaching cycles each including in succession an advance of the fixture to broaching position, a broaching stroke of the ram, withdrawal of the fixture from broaching position and return of the ram, means for causing the fixture to advance to a greater extent toward the broach on each of said plurality of cycles, said hydraulic means including control valve means adapted when shifted in one direction to bring the ram to a stop when it is moving in its broaching direction and to institute withdrawal of the fixture, a rotatable shaft for shifting said valve means in said direction, means having a substantially radial projection rotatable with said shaft, a projection on said ram normally adapted to engage the projection on the shaft during movement of the ram in broaching direction and thereby rotate said shaft to shift the valve means in said direction before the finishing teeth of the broach have engaged the work, means on the fixture for engaging one of said projections and moving it parallel to the axis of the shaft until it will no longer engage the other element when the fixture has moved a predetermined distance toward the broach, and means operable to engage said projection on the shaft and thereby shift said valve means in said direction when the finishing teeth of the broach have passed over the work.

4. In an automatic multiple stroke hydraulic broaching machine, a broaching ram, a reciprocating work fixture, hydraulic means for automatically operating the ram and fixture through a plurality of broaching cycles each including in succession an advance of the fixture to broaching position, a broaching stroke of the ram, withdrawal of the fixture from broaching position and return of the ram, means for causing the fixture to advance to a greater extent toward the broach on each of said plurality of cycles, said hydraulic means including control valve means adapted when shifted in one direction to bring the ram to a stop when it is moving in its broaching direction and to institute withdrawal of the fixture, a rotatable shaft for shifting said valve means in said direction, means fixed against rotation with respect to but axially slidable with respect to said shaft, said means including a substantially radially projecting finger, a pair of trip dogs fixed to the ram and movable therewith in parallel paths, resilient means normally holding said first mentioned means in the path of movement of one of said dogs, said one dog being adapted to engage said finger and thereby rotate the shaft and shift said valve means in said direction when the ram is moving in its broaching direction and before the finishing teeth of the broach engage the work, and means on the fixture adapted to engage said first means and shift it axially until the finger is in the path of movement of the other dog when the fixture has moved a predetermined distance toward the broach, said other dog being adapted to engage the finger after the finishing teeth of the broach have passed over the work.

5. In a hydraulically operated machine having a plurality of hydraulically operated mechanisms adapted to operate automatically through a plurality of complete cycles of operation, the operation of one of which mechanisms is instituted by admission of pilot pressure to a pilot controlled valve associated with said one mechanism, the combination of a pilot line for supplying pilot pressure to said valve, a control means for said machine associated with said pilot line, said means including an index valve in said line and an indexing mechanism for shifting said index valve into a position in which it blocks passage of fluid through said pilot line, and means for effecting an incremental movement of said indexing mechanism toward the position in which it effects said shift of the index valve once during each cycle of operation of said machine whereby said valve will be so shifted after the machine has completed a predetermined number of complete cycles of operation.

6. In a hydraulically operated machine having a plurality of hydraulically operated mechanisms adapted to operate automatically through a plurality of complete cycles of operation, the operation of one of which mechanisms is instituted by admission of pilot pressure to a pilot controlled valve associated with said one mechanism, the combination of a pilot line for supplying pilot pressure to said valve, a control means for said machine associated with said pilot line, said means including an index valve in said line, an indexing mechanism for shifting said index valve into a position in which it blocks passage of fluid through said pilot line, and means for effecting an incremental movement of said indexing mechanism toward the position in which it effects said shift of the index valve once during each cycle of operation of said machine whereby said valve will be so shifted after the machine has completed a predetermined number of complete cycles of operation and manually operated means to cause flow through said line independently of said indexing mechanism.

7. In a hydraulically operated machine having a plurality of hydraulically operated mechanisms adapted to operate automatically through a plurality of complete cycles of operation, the operation of one of which mechanisms is initiated by admission of pilot pressure to a pilot controlled valve associated with said mechanism, the combination of a pilot line for supplying pilot pressure to said valve, a control means for said machine associated with said pilot line, said means including a manually operable valve and an index valve for controlling flow of pilot fluid through said line, said index valve being operable to permit flow through said line when the manually operable valve is closed, an indexing mechanism for actuating said index valve to cause said index valve to block the flow of pilot fluid under pressure through said line to said pilot operated valve, and means for effecting an incremental movement of said indexing mechanism toward the position in which it effects said actuation of the index valve once during each cycle of operation of said machine whereby said valve will be so actuated after the machine has completed a predetermined number of complete cycles of operation, said manually operable valve being normally closed but effective when opened to permit flow of pilot fluid through said line when the index valve is in blocking position.

8. In a hydraulically operated machine having a source of liquid under pressure, a low pressure reservoir and a plurality of hydraulically operated mechanisms adapted to operate automatically through a plurality of complete cycles of operation, the operation of one of which mechanisms is initiated by admission of pilot liquid under pressure to a pilot controlled valve associated with said mechanism, the combination of a pilot line for conducting pilot liquid to and from said valve, a control means for said machine associated with said pilot line and effective to control communication between said line and said source of liquid under pressure and said reservoir, said means including a manually operable valve and an index valve associated with said line, said index valve being operable to connect said line to said pressure source when the manually operable valve is closed, said manually operable valve being normally closed but effective when opened to connect said line to said pressure source regardless of the position of the index valve, an indexing mechanism for actuating said index valve to cause said index valve to block the flow of pilot fluid under pressure through said line to said pilot operated valve, and means for effecting an incremental movement of said indexing mechanism toward the position in which it effects said actuation of the index valve once during each cycle of operation of said machine whereby said valve will be so actuated after the machine has completed a predetermined number of complete cycles of operation, said control means including means for connecting said line to the low pressure reservoir when both said manually operable valve and said index valve are closed to prevent flow of pilot liquid under pressure to said pilot operated valve.

9. In a hydraulically operated machine having a plurality of hydraulically operated mechanisms adapted to operate automatically through a plurality of complete cycles of operation, the operation of one of which mechanisms is initiated by admission of pilot fluid under pressure to a pilot controlled valve associated with said mechanism, the combination of a pilot line for conducting pilot liquid to and from said valve, a control means for said machine associated with said pilot line, said means including a by-pass line connected in parallel with a portion of said line, a manually operable valve in said line effective in its normal position to block communication through said line and open communication through said by-pass line and effective in another position to open communication through said line and block communication through said by-pass line, an index valve in said by-pass line effective in one position to block flow of pilot fluid in said by-pass line toward said pilot operated valve and to permit unrestricted flow of fluid from said pilot operated valve and effective in another position to permit flow in either direction through said by-pass line, an indexing mechanism for controlling the position of said index valve and effective to shift said index valve to said first mentioned position, and means for effecting an incremental movement of said indexing mechanism toward the position in which it effects said shift of the index valve to said first mentioned position once during each cycle of operation of said machine, whereby said valve will be shifted to said first mentioned position after the machine has completed a predetermined number of complete cycles of operation.

10. In a hydraulic broaching machine, a pilot operated valve for controlling the flow of fluid to and from a broach moving piston and cylinder mechanism, a second pilot operated valve for controlling the flow of fluid to and from a piston and cylinder mechanism for operating a work holding table, means including pilot valves controlled by the positions of said mechanisms for actuating said pilot operated valves to effect a plurality of complete cycles of operation each including in succession advance of the table mechanism, a broaching stroke of the broach, return of the table mechanism and return of the broach, auxiliary control means connected in the pilot line to that end of the second pilot operated valve which, when connected to a source of pilot pressure, shifts said valve to table advancing position for controlling the flow of pilot fluid in said line, said means including an index valve in said line and an indexing mechanism for shifting said valve into a position in which it blocks flow of pilot fluid under pressure through said line to said second pilot operated valve, and means for effecting an incremental movement of said indexing mechanism toward the position in which it effects said shift of the index valve once during each cycle of operation of said machine whereby said valve will be so shifted after the machine has completed a predetermined number of complete cycles of operation.

11. In a hydraulic broaching machine, a pilot operated valve for controlling the flow of fluid to and from a broach moving piston and cylinder mechanism, a second pilot operated valve for controlling the flow of fluid to and from a piston and cylinder mechanism for operating a work holding table, means including pilot valves controlled by the positions of said mechanisms for actuating said pilot operated valves to effect a plurality of complete cycles of operation each including in succession advance of the table mechanism, a broaching stroke of the broach, return of the table mechanism and return of the broach, and auxiliary control means connected in the pilot line to that end of the second pilot operated valve which, when connected to a source of pilot pressure, shifts said valve to table advancing position for controlling the flow of pilot fluid in said line, said means including an index valve in said line, an indexing mechanism for shifting said valve into a position in which it blocks flow of pilot fluid under pressure through said line to said second pilot operated valve, means for effecting an incremental movement of said indexing mechanism toward the position in which it effects said shift of the index valve once during each cycle of operation of said machine whereby said valve will be so shifted after the machine has completed a predetermined number of complete cycles of operation and manually operated means to cause flow through said line independently of said index valve.

12. In a hydraulic broaching machine, a pilot operated valve for controlling the flow of fluid to and from a broach moving piston and cylinder mechanism, a second pilot operated valve for controlling the flow of fluid to and from a piston and cylinder mechanism for operating a work holding table, means including pilot valves controlled by the positions of said mechanisms for actuating said pilot operated valves to effect a plurality of complete cycles of operation, each including in succession advance of the table mechanism, a broaching stroke of the broach, return of the table mechanism and return of the broach, and auxiliary control means connected in the pilot line to that end of the second pilot operated valve which, when connected to a source of pilot pressure, shifts said valve to table advancing position for controlling the flow of pilot fluid in said line, said means including a normally closed valve manually operable to permit flow through said line, an index valve operable to permit flow through said line when the manually operable valve is closed, an indexing mechanism for actuating said index valve to cause said valve to block the flow of pilot fluid under pressure through said line to said pilot operated valve, and means for effecting an incremental movement of said indexing mechanism toward the position in which it effects said actuation of the index valve once during each cycle of operation of said machine whereby said valve will be so actuated after the machine has completed a predetermined number of complete cycles of operation.

13. In a hydraulic broaching machine, a pilot operated valve for controlling the flow of fluid to and from a broach moving piston and cylinder mechanism, a second pilot operated valve for controlling the flow of fluid to and from a piston and cylinder mechanism for operating a work holding table, means including pilot valves controlled by the positions of said mechanisms for actuating said pilot operated valves to effect a plurality of complete cycles of operation, each including in succession advance of the table mechanism, a broaching stroke of the broach, return of the table mechanism and return of the broach, and auxiliary control means connected in the pilot line to that end of the second pilot operated valve which, when connected to a source of pilot pressure, shifts said valve to table advancing position for controlling the flow of pilot fluid in said line, said means including a normally closed valve manually operable to permit flow through said line, an index valve operable to permit flow through said line when the manually operable valve is closed, an indexing mechanism for actuating said index valve to cause said valve to block the flow of pilot fluid under pressure through said line to said pilot operated valve, and means for effecting an incremental movement of said indexing mechanism toward the position in which it effects said actuation of the index valve once during each cycle of operation of said machine whereby said valve will be so actuated after the machine has completed a predetermined number of complete cycles of operation, said control means being adapted to permit return flow of pilot fluid from that end of said pilot operated valve to which said line is connected when both said manually operable valve and said index valve are closed to prevent flow of pilot fluid to said end of said pilot operated valve.

14. In a hydraulic broaching machine, a pilot operated valve for controlling the flow of fluid to and from a broach moving piston and cylinder mechanism, a second pilot operated valve for controlling the flow of fluid to and from a piston and cylinder mechanism for operating a work holding table, means including pilot valves controlled by the positions of said mechanisms for actuating said pilot operated valves to effect a plurality of complete cycles of operation, each including in succession advance of the table mechanism, a broaching stroke of the broach, return of the table mechanism and return of the broach, and auxiliary control means connected in the pilot line to that end of the second pilot operated valve which, when connected to a source of pilot pressure, shifts said valve to table advancing position for controlling the flow of pilot fluid in said line, said means including a by-pass line connected in parallel with a portion of said line, a manually operable valve in said line effective in its normal position to block communication through said line and open communication through said by-pass line and effective in another position to open communication through said line and block communication through said by-pass line, an index valve in said by-pass line effective in one position to block flow of pilot fluid in said by-pass line toward said pilot operated valve and to permit unrestricted flow of fluid from said pilot operated valve and effective in another position to permit flow in either direction through said by-pass line, an indexing mechanism for controlling the position of said index valve and effective to shift said index valve to said first mentioned position, and means for effecting an incremental movement of said indexing mechanism toward the position in which it effects said shift of the index valve to said first mentioned position once during each cycle of operation of said machine whereby said valve will be shifted to said first mentioned position after the machine has completed a predetermined number of complete cycles of operation.

BENEDICT WELTE.